United States Patent [19]
Pelzer

[11] Patent Number: 5,092,192
[45] Date of Patent: Mar. 3, 1992

[54] SOUND ATTENUATION IN WHEELS

[76] Inventor: Helmut Pelzer, Neue Strasse 5, D-5804 Herdecke-Ende, Fed. Rep. of Germany

[21] Appl. No.: 529,858

[22] Filed: May 29, 1990

Related U.S. Application Data

[60] Division of Ser. No. 357,660, May 25, 1989, Pat. No. 4,970,909, which is a continuation of Ser. No. 181,363, Apr. 7, 1988, abandoned.

[30] Foreign Application Priority Data

Apr. 8, 1987 [DE] Fed. Rep. of Germany ....... 3711359

[51] Int. Cl.⁵ .............................................. F16H 55/14
[52] U.S. Cl. ...................................... 74/443; 74/574; 295/7; 301/6 WB
[58] Field of Search ....................... 74/443, 574; 295/7; 301/6 WB; 464/180; 210/51

[56] References Cited

U.S. PATENT DOCUMENTS

| | | | |
|---|---|---|---|
| 1,203,549 | 10/1916 | Alquist | 74/443 |
| 2,874,008 | 2/1959 | Orte et al. | 310/51 X |
| 4,635,501 | 1/1987 | Mizuno et al. | 74/574 |

FOREIGN PATENT DOCUMENTS

| | | | |
|---|---|---|---|
| 50567 | 4/1982 | European Pat. Off. | 295/7 |
| 1926312 | 11/1970 | Fed. Rep. of Germany | 295/7 |
| 1310080 | 10/1962 | France | 74/443 |
| 2086528 | 5/1982 | United Kingdom | 74/443 |
| 212686 | 3/1984 | United Kingdom | 74/443 |

OTHER PUBLICATIONS

PTD Publication by Drago and Brown dtd 7/1979 titled "why gears explode" pp. 77-81.

*Primary Examiner*—Allan D. Herrmann
*Attorney, Agent, or Firm*—R. H. Siegemund

[57] ABSTRACT

A device for attenuating sound in and of wheels, the wheel having a rim portion, a hub, and a web in between, there being a radially inwardly oriented flange surface, is improved by an attenuating layer on or in a groove of the flange surface, possibly with an extension against the web, and a cover, radially outwardly, and axially urging the attenuating layer upon the flange and the web.

6 Claims, 2 Drawing Sheets

SOUND ATTENUATION IN WHEELS

This is a divisional application of co-pending application Ser. No. 07/357,660 filed on May 25, 1989, now U.S. Pat. No. 4,970,909 (issued Nov. 20, 1990) which is a continuation of Ser. No. 07/181,363, filed Apr. 7, 1988, now abandoned.

BACKGROUND OF THE INVENTION

The present invention relates to the attenuation of sound, being conducted either through the air or through solid material, for purposes of soundproofing wheels, particularly gears.

Gears upon engaging, even under very normal conditions of operation, are subjected to a so-called insertion or engagement impact; as the feet engage there is an impact which stimulates vibrations, usually characteristic, natural vibrations, and in various modes.

These modes depend, of course, on the shape but also on the stiffness of the gear. The engagement, and, therefore, the stimulation depends on the configuration of the gearing. For example, in a typical case, a gear generally is comprised of the following separate elements; a hub, a gear disk, and gear rings, rims, or spurs.

The construction as outlined sets up a first resonance frequency at a mode which is equivalent to tilting the hub vis-a-vis the disk. The axis of rotation of the gear will then no longer be at right angles to the plane of the gear rim. This kind of oscillation produces primarily vibrations in the gear itself, and in solid parts being in physical connection therewith. This may be termed body sounds; sound generation in air is not very prevalent for this kind of mode.

In a second mode, the rim element or gear ring provides a periodic pumping motion in direction of the shaft, actually, in phase opposition but in two 90° offset directions. This results in a periodic bending of the disk as between two 90° offset ovals. Simultaneously, the hub is deformed, in accordance with two 90° offset ovals, but these oscillations are only 90° offset, so that in the case of a maximum deformation of the disks, in one direction, a maximum deformation of the hub in a 90° angle obtains.

This particular mode, actually, is more important because for some reason it involves more energy and, therefore, produces more severe noise on and in the rim. It should be realized that increasing the stiffness of the disk, from an overall point of view, does not reduce the oscillations but rather shifts them towards higher frequencies. Hence, it is and remains necessary to attenuate the amplitude of the oscillation, at whatever frequency it occurs, in order to provide for a suppression of this particular kind of oscillation. This mode is, moreover, primarily responsible for body sound but also for sound eminating into and propagating through air.

A third mode involves a pumping motion of the hub in direction of the shaft in that three actions are superimposed. There is a strong bending of the disk, a lifting and tilting of the hub, and a pumping of the gear ring. In fact, four nodes are established therewith. Again, this mode is important and significant for body sound as well as sound propagating in and through air.

One can see from the description above that upon energizing and exciting these several modes, generally one obtains axial oscillations as well as radial ones. German printed patent application 31 41 101 suggests to provide a cover on both sides of the disk of the gear and with a visco-elastic attenuation layer is interposed, in order to obtain attenuation of the vibration of the gear. The description of this particular publication, page 1, last paragraph, as continued on page 2, first paragraph, reveals that this particular attenuation is provided just to eliminate and attenuate axial oscillations, but not radial ones. This contention made in the reference is believed to be correct.

A publication by Drago and Brown in PTD, July, 1979, particularly page 80, last paragraph, and FIG. 6 on that same page, suggests to provide attenuating rings, for example, clamping rings with square-shaped cross-section to be placed into grooves which are formed in the rim of a wheel so that attenuation obtains by operation of the centrifugal motion of the ring. Thus, attenuation is strictly a matter of the mass involved.

DESCRIPTION OF THE INVENTION

It is an object of the present invention to provide a new and improved attenuation of vibrations and sound production in biparted wheels and gears, particularly with emphasis on the attenuation of radial oscillation or vibration, but in cases radial as well as axial vibrations are to be suppressed.

In accordance with the preferred embodiment of the present invention, it is suggested to provide in the biparted wheel or gear a common cavity, the walls of the cavity being lined with viscoelastic layer means for attenuation purposes of radial oscillations, preferably also of axial oscillation. In the case of wheels with recesses in the wheel disk, establishing a radial inwardly directed cylindrical flange surface, the attenuation of the radial oscillations obtains in that the visco-elastic material is forced against the wall of the cavity by resilient sheet means of U-shaped configuration. The sound attenuating material, as well as the sheet means have a radial extension such that the extended sound attenuating material is also axially urged against the wheel disk. Radial and/or radially patterned slots are provided in the gear wheel web. Cover and attenuating layer may be provided as a snap-in unit.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

Proceeding now to the detailed description of the drawings, FIG. 1 illustrates a gear disk 1 with a rim gear portion 13, and a hub portion 8. Reference numeral 2 refers to a recess on one side, having a circular cylindrical surface 3. That surface is a radially inwardly oriented surface of a flange or rim portion 1a, resulting from the recess 2.

Figure 1:
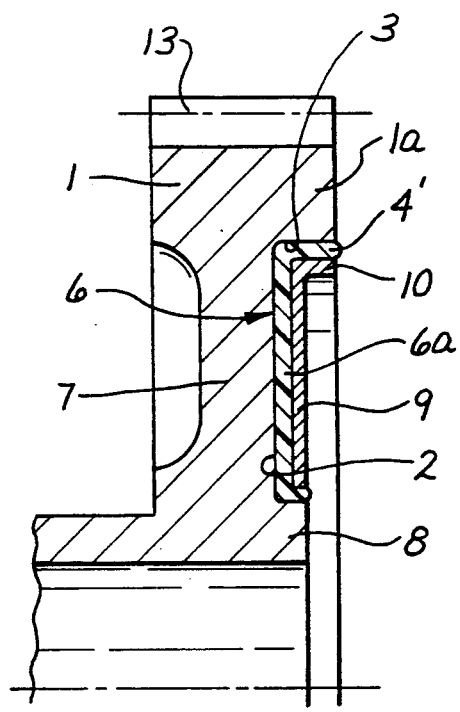
FIGS. 1 is a radial cross-section through a gear improved with sound attenuations for explaining certain background aspects.

An attenuating visco-elastic layer 6 includes a portion 4' and is extended into an annular part 6a to cover and abut against a web portion 7 of this particular gear wheel 1. That web is, so to speak, the bottom portion of the recess 2. Analogously, there is a ring which includes a flat steel annulus 9 as a cover sheet and being provided with an annular cylindrical flange 10, and urging the attenuating layer 6 radially, as well as axially, in contact with the gear wheel 1. In order to permit the attenuating layer, as well as the cover 10 to be very easily but firmly pressed into the recess, it is preferred to provide, for example, noses or ribs along the recess, as shown for instance, in FIGS. 4b and 4c.

The example shown in FIG. 1 clearly differs from attenuating devices shown in German printed patent application 31 41 101, because the structure as described in FIG. 1 shows a strong emphasis on the attenuation of radial oscillation.

The invention will now explained with reference to a wheel or gear which is split in a direction perpendicular to the axes, i.e. is made in effect from two parts, for example, wheels with arrow gears, have parts wherein the surface areas facing each other have complementary recesses so that together they provide a toroidal cavity with essentially rectangular cross-section and having its walls lined by visco-elastic attenuation layers, being retained therein by cover sheet of the kind mentioned above.

Figure 2:
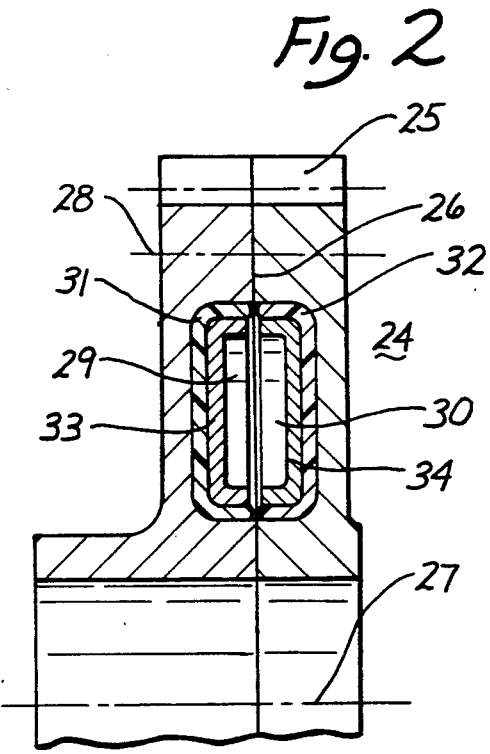
FIG. 2 is a cross-section through a multiple or duplicated arrangement, showing an example of the preferred embodiment of the invention.

In the case of FIG. 2, the wheel 24 has arrow-like teeth 25, and this gear is bi-parted along a line 26, that indicates a plane running transversely through the axes 27. These parts are put together and held together by means of screws or bolts 28. The two parts provided, respectively, with recesses 29 and 30, establish a common cavity. These recesses are shown to be in fact essentially similar indentations with rectangular walls being the walls of the common cavity. Cover sheets 33 and 34 (similar to 9-10 in FIG. 1) hold attenuation layers 31 and 32 against the walls of these recesses. This particular embodiment is somewhat more expensive but owing to the arrow gears, it is important that there be no axial forces, and that, of course, permits the illustrated soundproof mounting. The structure provides for a strong attenuation of air sound, as well as body sound.

In the FIG. 2 of the example above, using particularly an attenuation layer and a clamping or holding structure, it is advisable to provide for a dimension of the (radial) thickness such that the thickness values of the attenuated body of the attenuating layer and of the cover sheets have a ratio of 4:1:1.

Figure 3:
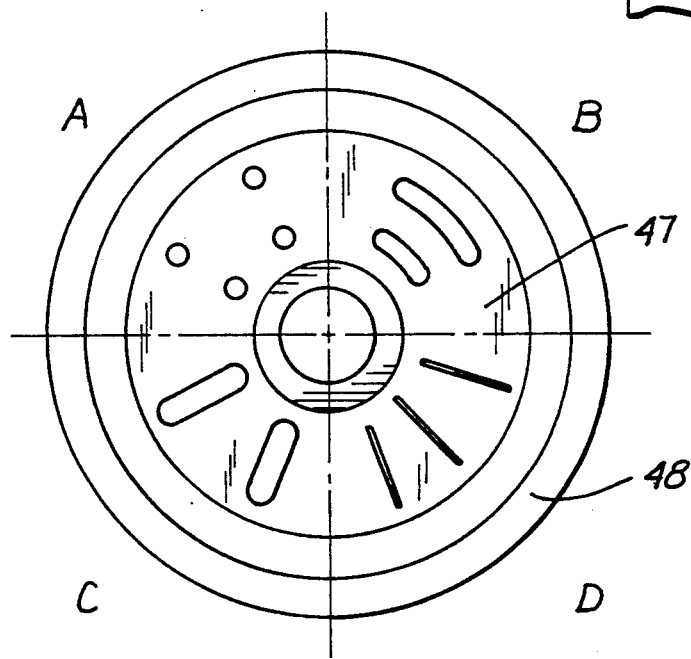
FIG. 3 is a composite representation of different slot patterns.

FIG. 3 illustrates in a composite fashion four sectors, actually showing four different patterns of possible recesses, perforations, apertures, holes, or the like, which may be provided in the respective gear wheel web 47 supporting the rim structure 48.

In accordance with this approach of practicing the invention, the gear disk web, generally, is provided with axially penetrating perforations which have either a predominantly radial extension (C and D) or follow a radial pattern (A and B). The attenuation is provided in that these recesses are provided in the wheel disk and penetrate the disk web all the way. The penetrations and perforations are annular (B) or radial (C, D), or concentric segments (A, B) of narrow slots. These slots reduce sound radiation into air by providing, so to speak, an aerodynamic short-circuit, as between the front and the back.

Figure 4A:
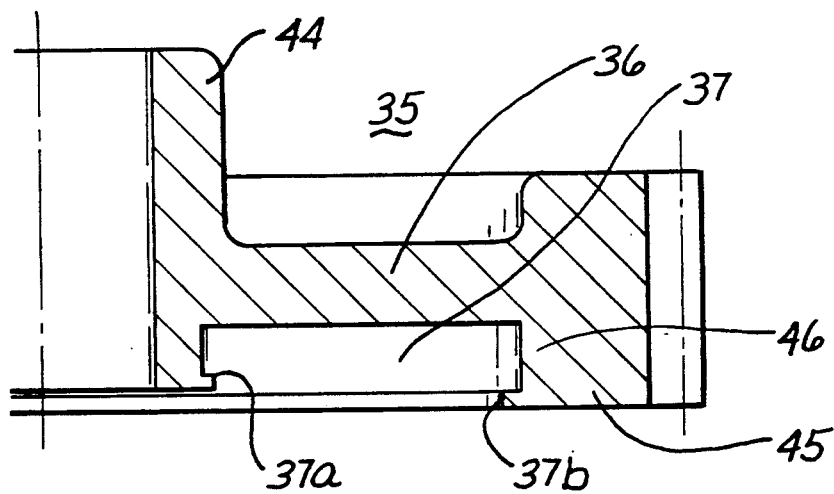
FIGS. 4a is a section view through a gear into which is inserted an attenuator shown in section in FIG. 4b and in partial elevation in FIG. 4c

In order to combine the various configurations explained above with others having attenuation and cover, it is suggested to provide attenuating layer and covers as separate elements which are assembled and superimposed, and together put into the desired position. FIGS. 4a, b, and c provide examples, showing and indicating that and how the combination of various other features is also possible.

Figure 4B:
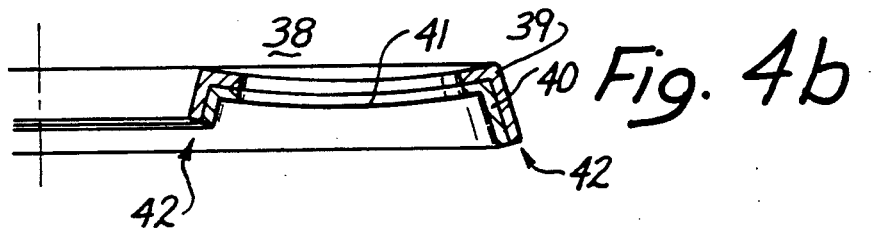
FIG. 4d shows a composite of FIG. 4a and 4b.
Figure 4C:
Figure 4D:
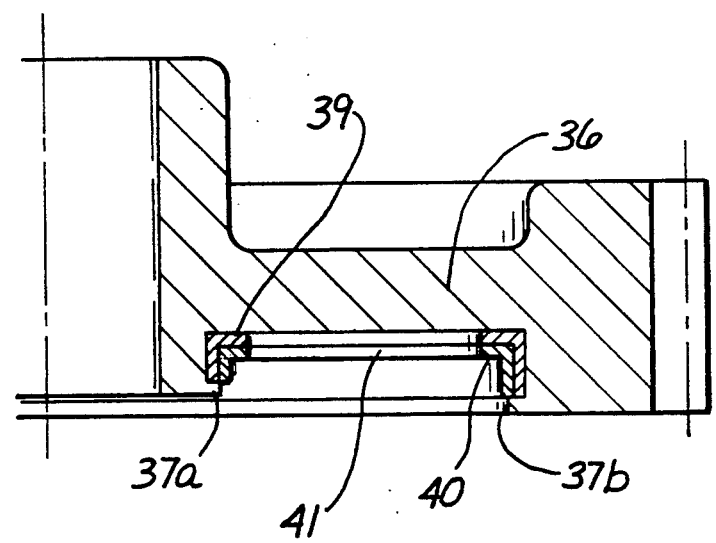

FIG. 4a shows a gear 35, having a disk or web 36, a hub 44, and a gear ring 45 with inner flange 46. The web 36 has recesses on both sides, whereby the recess 37 is particularly provided with overhung ridges establishing radially inwardly oriented flanges 37a and 37b. An annular attenuation device 38 with noses 42 is forced into that recess so that 38 is held in the recess by snap action. This snap action holding of the part 39 and thus of part 40 by snap action of 39 against surfaces of the flanges or ridges 37a, b is shown in FIG. 4d. This attenuation device 38 includes an attenuating element 39, and a cover 40. Disk 36, as well as attenuator 38, are provided with radial or radially patterned openings or slots 41, as shown in FIGS. 4b and 4c. As far as the two parts 39 and 40 are concerned, they are axially superimposed.

The inventive attenuation has the advantage that wheels, gears, and the like of conventional manufacture, including the precision of such manufacture, reduces the sound emanation, while the cost of manufacture is reduced. The precision can be reduced without producing additional sound.

The invention is not limited to the embodiments described above, but all changes and modifications thereof, not constituting departures from the spirit and scope of the invention, are intended to be included.

I claim:

1. Device for attenuating sound in and of a biparted wheel each part of the wheel having a web and a rim portion, each rim portion having a radially inwardly oriented flange surface, the improvement comprising,
   owing to said flange surfaces there being defined a common cavity being established by two essentially similar recesses with essentially rectangular cross section of its walls; and
   the walls of said cavity being lined with viscoelastic attenuating layer means and two resilient sheet means of U-shaped configuration urging the layers onto walls of said recesses.

2. Device as in claim 1, the web of the wheel being provided with openings.

3. Device as in claim 2 the openings being radial or radially patterned slots.

4. Device as in claim 1 the layer and sheet means being held in the wheel by snap action.

5. The improvement as in claim 1 wherein the viscoelastic attenuating layer has a thickness approximately equal to the thickness of the sheet means.

6. The improvement as in claim 1 the thickness of said wheel being approximately four times the thickness of said sheet means.

* * * * *